(12) United States Patent
Kupisiewicz et al.

(10) Patent No.: US 12,485,501 B2
(45) Date of Patent: Dec. 2, 2025

(54) OPTICAL SYSTEM FOR LASER MACHINING

(71) Applicant: LASER ENGINEERING APPLICATIONS, Seraing (BE)

(72) Inventors: Axel Stefan M Kupisiewicz, Neupré (BE); Jose Antonio Ramos De Campos, Seraing (BE); Paul-Etienne Martin, Bordeaux (FR); Sébastien Estival, Talence (FR)

(73) Assignee: LASER ENGINEERING APPLICATIONS, Seraing (BE)

( * ) Notice: Subject to any disclaimer, the term of this patent is extended or adjusted under 35 U.S.C. 154(b) by 653 days.

(21) Appl. No.: 17/920,615

(22) PCT Filed: Apr. 16, 2021

(86) PCT No.: PCT/EP2021/059978
§ 371 (c)(1),
(2) Date: Oct. 21, 2022

(87) PCT Pub. No.: WO2021/213938
PCT Pub. Date: Oct. 28, 2021

(65) Prior Publication Data
US 2023/0150062 A1 May 18, 2023

(30) Foreign Application Priority Data
Apr. 24, 2020 (BE) .................................. 2020/5275

(51) Int. Cl.
*B23K 26/067* (2006.01)
*B23K 26/0622* (2014.01)
(Continued)

(52) U.S. Cl.
CPC ...... *B23K 26/0673* (2013.01); *B23K 26/0624* (2015.10); *G02B 19/0047* (2013.01);
(Continued)

(58) Field of Classification Search
CPC ............ B23K 26/0673; B23K 26/0624; G02B 19/0047; G02B 26/0816; G02B 27/106; G02B 27/1086; G02F 1/136277
See application file for complete search history.

(56) References Cited

U.S. PATENT DOCUMENTS 7,629,555 B2 12/2009 Gross et al.
2010/0270277 A1 10/2010 Matsumoto et al.

FOREIGN PATENT DOCUMENTS

DE 102014200633 B3 5/2015
WO 2020020931 A1 1/2020

OTHER PUBLICATIONS

International Search Report with English Translation and Written Opinion for PCT Application No. PCT/EP2021/059978, dated Jul. 29, 2021, pp. 1-14.

*Primary Examiner* — Sabbir Hasan
(74) *Attorney, Agent, or Firm* — Dickinson Wright PLLC

(57) ABSTRACT

Disclosed is an optical system for laser machining that enables simpler and more reliable machining of several patterns simultaneously on the same part. The system comprises an ultra-short pulse laser source for generating a source laser beam; a device with a separation means for separating a source laser beam into a plurality of separated laser beams, such that each of the separated laser beams is directed in a direction of propagation specific thereto; a spatial offsetting unit for obtaining, from the plurality of separated laser beams, a plurality of offset laser beams such that each offset laser beam can propagate around a main axis of propagation A specific thereto and is capable of describing a movement around the main axis of propagation A; and a focusing means configured to focus each offset laser beam on a workpiece in the direction of the axis of propagation specific thereto.

20 Claims, 7 Drawing Sheets

(51) Int. Cl.
  *G02B 19/00*    (2006.01)
  *G02B 26/08*    (2006.01)
  *G02B 27/10*    (2006.01)
  *G02F 1/1362*   (2006.01)
(52) U.S. Cl.
  CPC ....... *G02B 26/0816* (2013.01); *G02B 27/106* (2013.01); *G02B 27/1086* (2013.01); *G02F 1/136277* (2013.01); *G02F 2203/02* (2013.01); *G02F 2203/12* (2013.01); *G02F 2203/50* (2013.01)

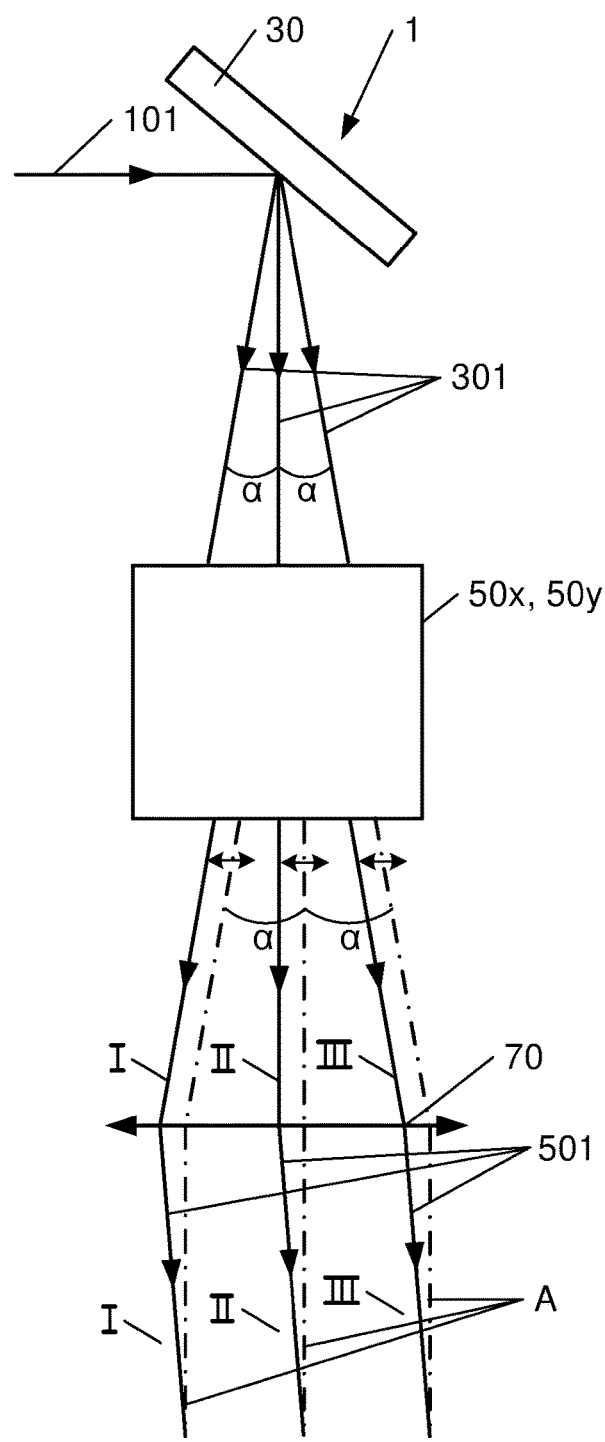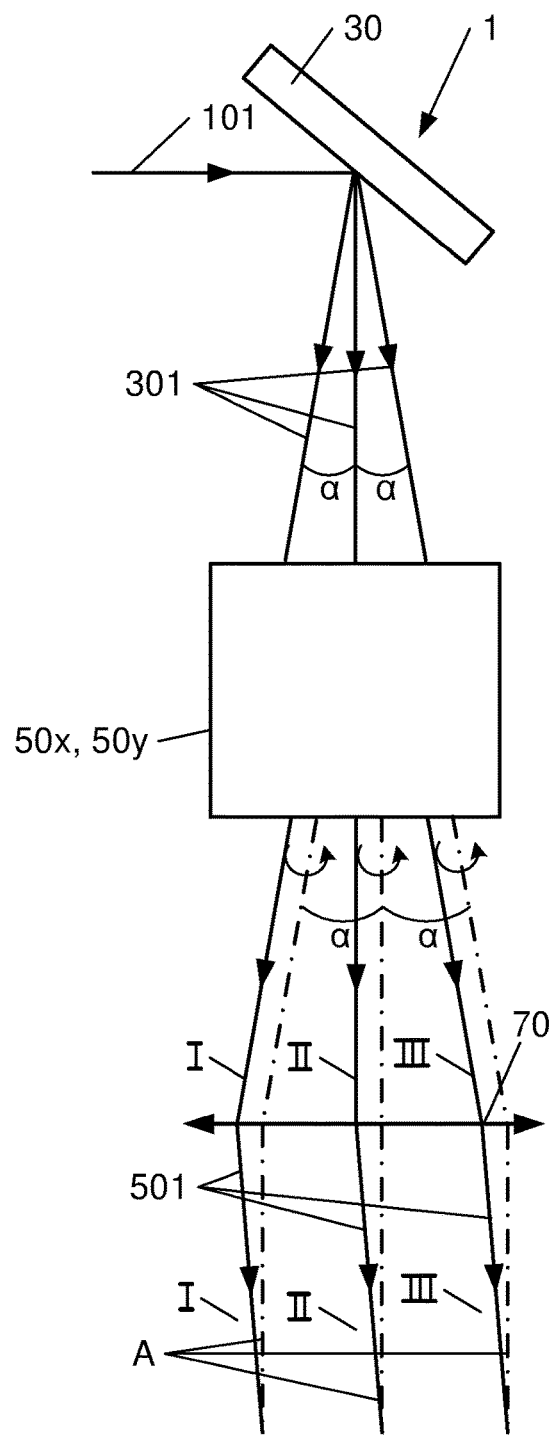
*Fig.1*  *Fig.2*

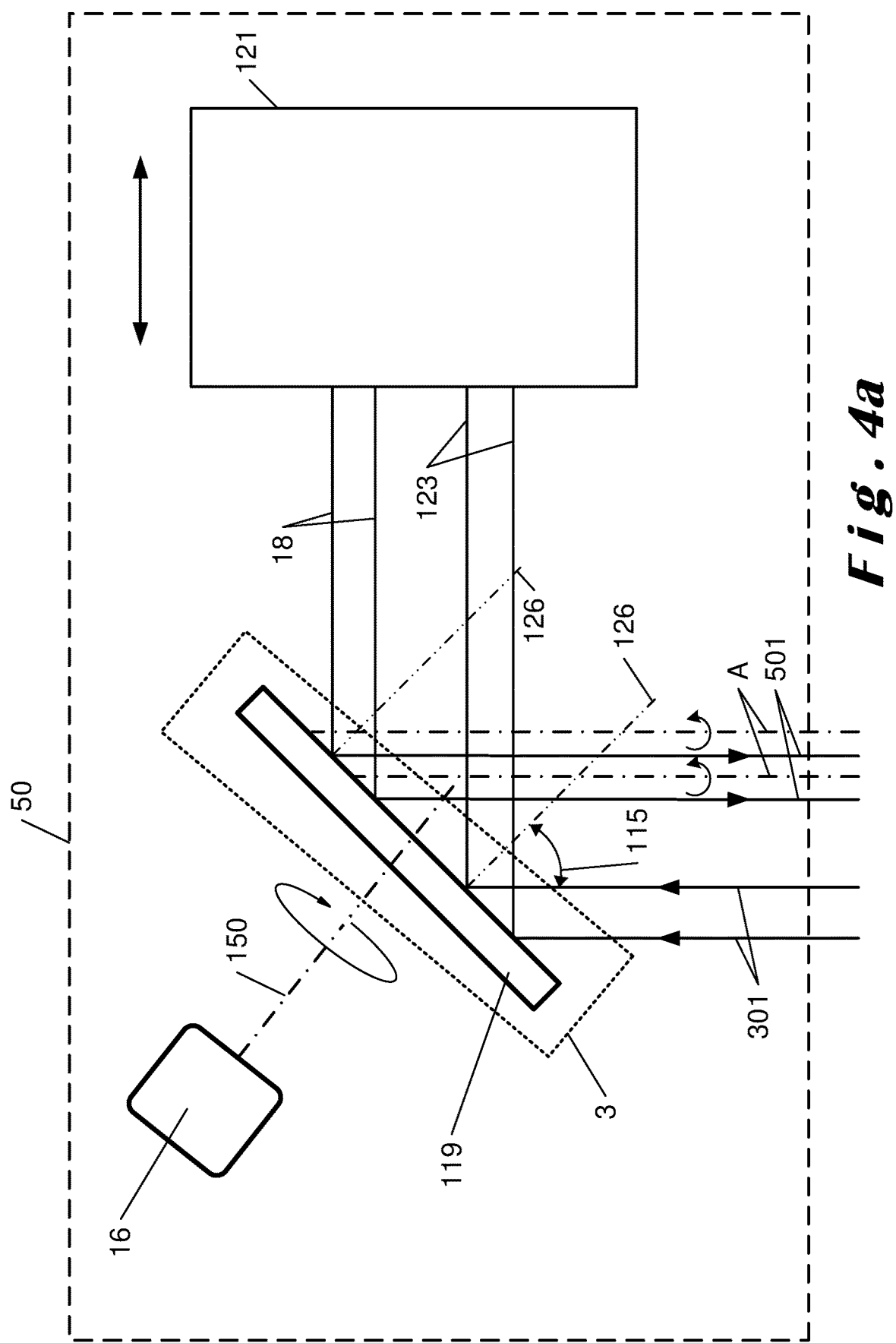

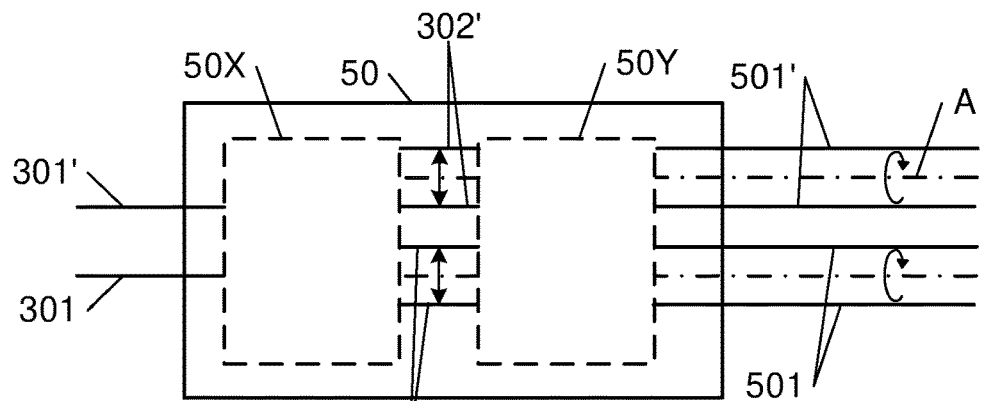
Fig. 4b
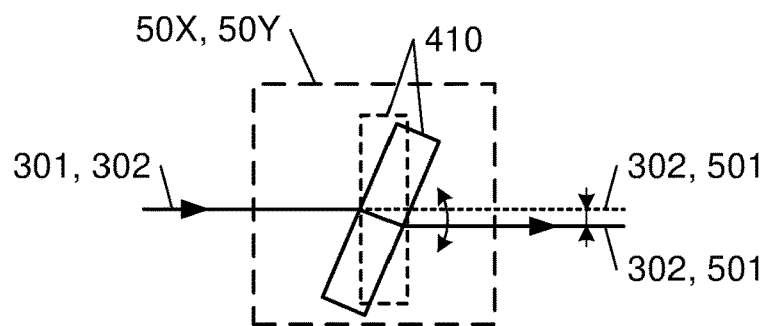
Fig. 4C
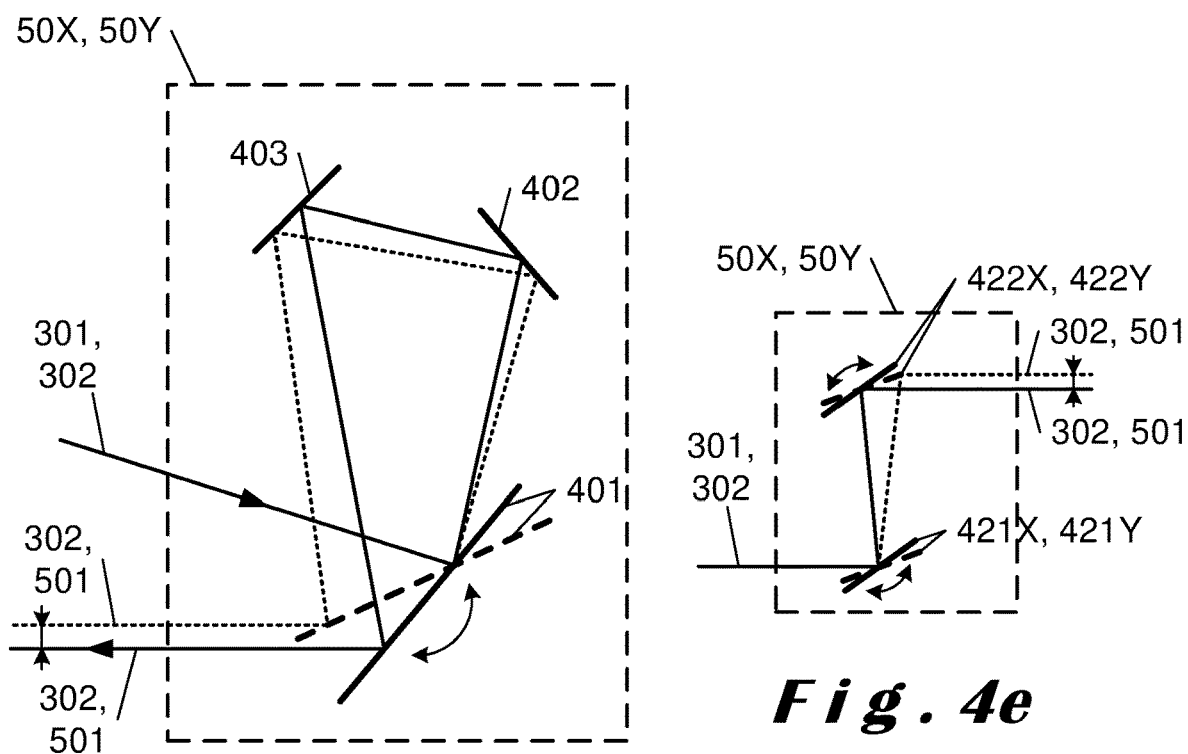
Fig. 4d
Fig. 4e

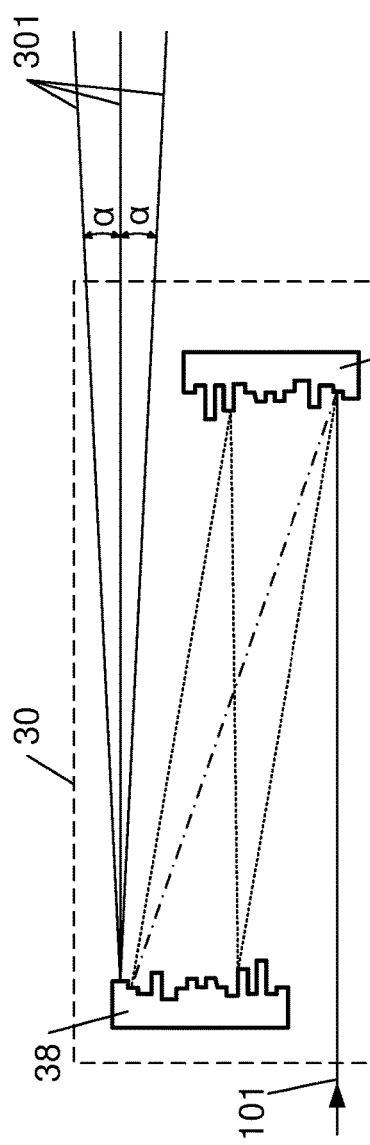
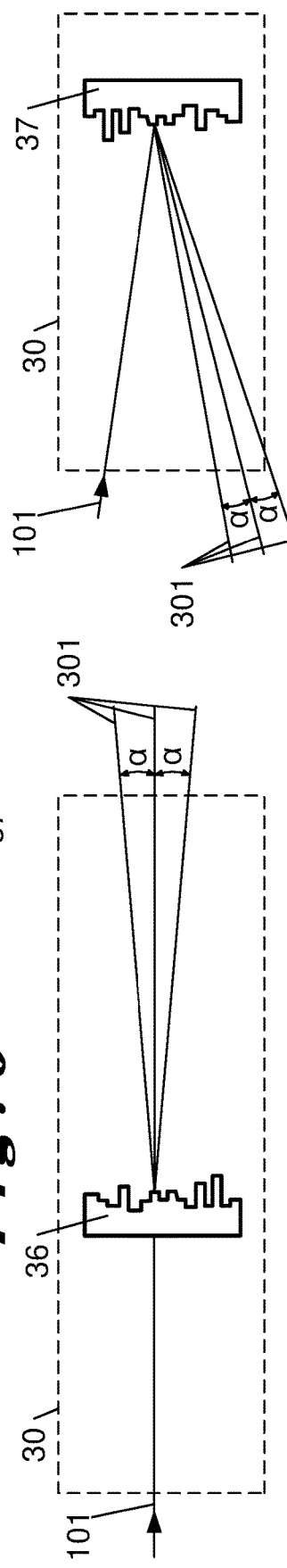
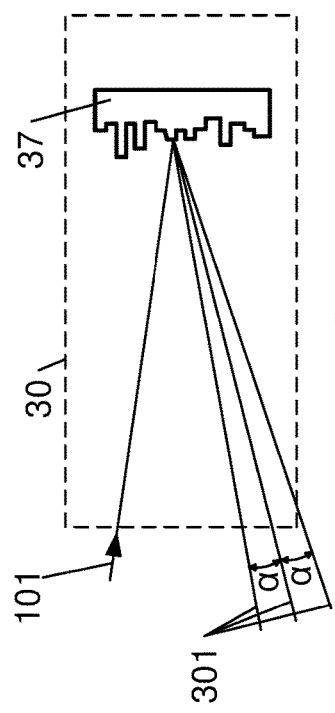
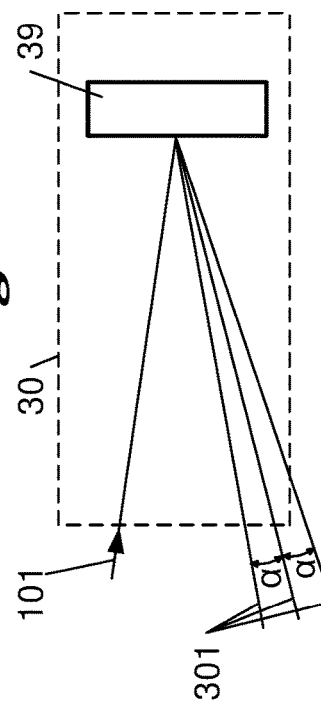
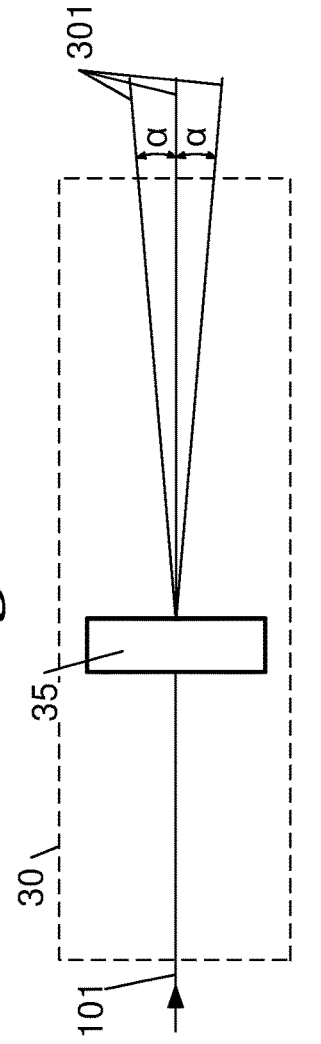

OPTICAL SYSTEM FOR LASER MACHINING

CROSS-REFERENCE TO RELATED APPLICATION(S)

This present application is a national stage application of International Patent Application No. PCT/EP2021/059978, filed Apr. 16, 2021, which claims priority to Belgium Patent Application No. 2020/5275, filed Apr. 24, 2020, the disclosures of which are hereby incorporated by reference in their entireties.

TECHNICAL FIELD

In one aspect, the invention relates to an optical system for laser machining. According to another aspect, the invention relates to a method for providing a plurality of offset laser beams for machining a part.

PRIOR ART

Ultra-short pulse laser sources with average powers in excess of hundred watts and allowing peak powers of the order of a gigawatt (thus having energies per pulse of more than 1 mJ) are now available on the market. These theoretically allow an increase in productivity through an increase in machining speed. However, the use of such laser sources for machining a part, without lowering the average power of the laser source, is generally not possible, because of thermal effects on the part that can lead to deformation (or even destruction), oxidation, or structural changes.

These thermal effects are all the more harmful when it is desired to machine areas very close to each other on the same part. Indeed, the machining of one area can be influenced by the heating associated with the machining of an adjacent area: the heat generated during the machining of such an adjacent area does not have time to dissipate during the machining of a new area.

The thermal effects due to the use of a high power laser source can be reduced by irradiating larger areas with a pulse of the same pulse energy. However, for many applications, especially for the laser micro-machining, it is desired to use small machining beams to achieve high geometric accuracies.

The laser machining methods now make more use of scanning heads (e.g. deflection means, scanners) rather than displacing means of the target to scan the surface to be machined with the laser beam. This choice was made primarily for reasons of ease of use and machining speed. However, due to the generally Gaussian distribution of the laser beam, the use of a scanner results in machining with conical cutting faces: these cutting faces are therefore not perpendicular to the surface of attack. For some applications this is not acceptable.

In order to control or eliminate the conicity of the cutting faces, precession devices have been developed. These precession devices allow to control the attack angle of the laser beam on the target to be machined. This control of the attack angle allows better control of the conicity of the cutting faces.

DE 10 2014 200 633 B3 describes a machining system allowing to distribute the power of a laser source over an extended area by dividing a spatially offset laser beam into a plurality of spatially offset secondary beams. This document also describes means for controlling the attack angle of the plurality of the secondary beams on a workpiece. However, the machining device described in DE 10 2014 200 633 B3 is complex to implement, specific to one type of machining and difficult to adapt to the evolutions in the power of the laser sources.

SUMMARY OF THE INVENTION

According to one aspect, one of the purposes of the present invention is to propose an optical system for laser machining that allows for simpler and more robust machining of multiple patterns simultaneously on a same part.

For this purpose, the inventors suggest an optical system for laser machining, comprising:
- an ultra-short pulse laser source to generate a source laser beam;
- a device comprising:
  - separating means for separating a source laser beam into a plurality of separated laser beams, so that each of the separated laser beams is directed on its own propagation direction;
  - a spatial offsetting unit for obtaining from said plurality of separated laser beams, a plurality of offset laser beams so that each offset laser beam can propagate around its own main propagation axis A and is capable of describing a movement around the main propagation axis A;
  - focusing means configured to focus the offset laser beams on a workpiece in the direction of its own propagation axis.

The invention allows to obtain a high quality of machining thanks to an offset and a movement of each of the beams around their own axis of propagation before focusing, allowing, after focusing on the part, to focus (or redirect) the beams in the direction of their axis of propagation in order to have a non-zero attack angle of each beam on the part. The optical system for laser machining is particularly robust in terms of the wide range of laser sources it can support. Indeed, the device requiring only a limited number of optical elements, preferably in reflection, allows the use of a wide range of laser radiation wavelengths as well as power and or pulse duration of the source laser radiation. Furthermore, the device is robust because it comprises a very limited number of optical elements. Preferably all the optical elements are configured for reflection. In addition, the device requires a small number of optical elements interacting with the beam, which makes it more robust. This is because the smaller number of optical elements means that there is less risk that the alignment of an optical element will have to be corrected, resulting in the device being unavailable. On the other hand, the device requires simpler and smaller separating means because they are positioned before the rotation means of the beam. Before means here that the separating means are interacting with the source laser beam before the spatial offsetting unit in the optical path of the laser beam. Simpler and smaller separating means are necessarily more robust and less expensive. The positioning of the separating means before the spatial offsetting unit makes them particularly easy to program, as they are illuminated with immovable stationary beam. If the separating means were positioned downstream of the spatial offset means, then the separating means would have to be adjusted in real time to have a beam separation for all the offset positions of the beam thereon. It is therefore not compatible to place the separating means downstream of the spatial offset means. Preferably, the invention implements, downstream of the separating means, a spatial offsetting unit which is unique and receives all the separated beams, thus allowing the same offset to be easily applied to all the separated laser beams. Furthermore, according to the invention, the separating means separate the beams by a very small angle, which allows the use of focusing means that are a single optical element common to all the beams, thus allowing a single part to be treated with several beams. Even more preferably, the focusing means are telecentric.

Also, the invention allows the use of laser sources with a wide range of average laser powers and in particular laser sources with high average powers, in particular average powers higher than 100 W thanks to the use of a matrix optical modulation means for the separation of the laser beam. In particular, the invention allows to avoid the transport of the offset laser beams via an optical relay as proposed by DE 10 2014 200 633 B3. Such a transport of high power laser pulses via optical relay towards the workpiece can result in the generation of a plasma at the focus point (of the optical relay) which can lead to a loss of power and resolution when machining the part. Thus, the optical system of the invention allows the source laser beam to be separated into a plurality of laser beams, each laser beam being essentially collimated but propagating at slightly different angles. The plurality of laser beams can be seen as slightly divergent from a central propagation axis. Such a divergence, due to the proper angles of each of the beams, then results in lateral offsets on the workpiece. The invention thus allows to obtain a good machining quality in several positions of a workpiece, regardless of the power of the laser source used.

The invention also allows a faster machining thanks to the plurality of beams obtained and directed towards a workpiece, so that each beam, after focusing on the part, allows the machining of a segment of the part. The invention allows to obtain a high quality of machining thanks to the lateral offset of each of the beams before focusing, which translates after focusing on the part into a control of the attack angle of each beam on the part.

Preferably the plurality of laser beams separated by the separating means have a stationary polarisation in time.

Preferably, the spatial offset means are positioned downstream of the separating means to allow the spatial offset of each separate beam propagating in its own direction and regardless of its polarisation state. This is largely possible by using spatial offset means that do not use diffractive and/or refractive optical elements but mainly optical elements in reflection. Downstream here means that the spatial offsetting unit interacts with the source laser beam after the separating means in the optical path of the laser beam.

Preferably the laser source of the optical system allows to emit a pulsed laser beam, preferably with a pulse duration between $10^{-10}$ s and $10^{-15}$ s, preferably between $10^{-11}$ s and $10^{-14}$ s.

The laser machining with a pulsed laser radiation, preferably with ultra-short pulses (fs or between $10^{-10}$ s and $10^{-15}$ s), allows to obtain a good control of the machining. A good control of the machining usually results in good machining quality.

Preferably, offset laser beams of the plurality of offset laser beams being able to propagate around the main propagation axes A, said main propagation axes A describe non-zero angles α between them. Thus, said main propagation axes A of each offset laser beam describe a non-zero angle α between them. In other words, the plurality of offset laser beams that can propagate around the main propagation axes A of each offset laser beam describe non-zero angles α between them. The angles α between the propagation axes A are identical, which allows to easier control the orientation and the attack angle of the beams on the workpiece.

Such a non-zero angle α between each offset laser beam provides a relative divergence between them, allowing each to be spatially or laterally offset by the spatial or lateral offset means. The divergence of these can be used to achieve a sufficient separation between them when they are focused on the workpiece. Thanks to the separating means, it is possible to adjust this angle α and thus the distance between the plurality of machining laser beams. For example in the case of matrix modulation means (LCOS), depending on the displayed phase deflection map, the angle α can then be adjusted.

Preferably, each of said main propagation axes A of said offset laser beams describes an angle between 0.005° and 1° with respect to a main propagation axis A adjacent thereto, preferably 0.01° and 0.5°, even more preferably between 0.05° and 0.2°. For example, for an angle range of 0.01° to 0.5° this means that the spacing between two adjacent offset laser beams on a workpiece (at the focal point of the focusing means) is between 17 μm and 875 μm. For example, for an angle range between 0.05° and 0.2°, the spacing is between 87 μm and 350 μm. This allows the use of focusing means that are a single optical element common to all the offset beams.

According to a first embodiment, one of the purposes of the present invention is to propose an optical system for laser machining with a device allowing to adapt the machining laser beams in real time and independently of each other. According to this first embodiment, the inventors propose that the separating means are matrix modulation means, preferably reflection matrix modulation means.

The optical system for laser machining allows for a high degree of adaptability in the patterns that can be machined. Thus, the invention allows a high degree of adaptability of the machining obtained by separating the source laser beam by the matrix optical modulation means into a plurality of separated laser beams. Thus, it is possible to modulate in real time the dimensions and position of the plurality of separated laser beams formed by the matrix optical modulation means. Such an adaptability of the pattern to be machined in real time is implemented in a relatively simple way because the invention allows the separation into a plurality of beams upstream of the beam offset means allowing the precession of these on the workpiece.

According to a preferred embodiment of the first embodiment, the matrix optical modulation means is a spatial light modulator also known by the acronym SLM. Such an SLM can operate in reflection or transmission to interact with a source beam. An SLM allows, for example, to spatially modify: the amplitude and/or the phase and/or the polarisation of a beam interacting with the matrix optical modulation means. For example the matrix optical modulator is a liquid crystal on silicon matrix phase modulator (LCOS SLM). An SLM is preferably of the electrically addressed liquid crystal matrix type.

The first embodiment is particularly advantageous as it allows the use of matrix modulation means with a relatively small surface area because they are illuminated with a stationary laser beam. The positioning of the matrix modulation means upstream of the spatial offsetting unit makes them particularly easy to program as they are illuminated with a stationary beam. If the matrix modulation means were positioned downstream of the spatial offset means, as is the case in DE 10 2014 200 633 B3, then the matrix modulation means would have to be modulated in real time to have a beam separation for all offset positions of the beam thereon.

According to another preferred embodiment of the first embodiment, said matrix modulation means are matrix phase modulation means, preferably reflection matrix phase modulation means.

The matrix optical modulation means is an active optical element that allows spatial modulation of a laser radiation. Thus the matrix modulation means, allows the shape or the intensity of the beam to be changed by selectively modulating the interaction of the source laser beam with the matrix of pixels in the matrix optical modulation means. The display of a phase modulation map by the matrix optical modulation means allows a plurality of beams to be separated by diffraction from a single source (collimated) laser beam. Preferably, the matrix optical modulation means allows a modulation of the reflection phase, and thus the diffraction of the source beam into a plurality of beams by reflection. An advantage of the first embodiment is that a matrix optical modulation means is used which induces only a negligible divergence on the plurality of diffracted beams, thus not requiring collimation/focusing means between the matrix optical modulation means and the spatial offset means in order to be able to transport the beam to the workpiece.

According to another preferred embodiment of the first embodiment, said reflection matrix phase modulation means is an LCOS, in that it is adapted to separate said linearly polarised source laser beam into said plurality of separated laser beams.

In a second embodiment, said separating means comprises a stationary diffractive optical element for the beam shaping. The shaping of the laser beam corresponds to a separation of the laser beam into a plurality of separated laser beams. A stationary diffractive optical element is for example a DOE.

In a preferred embodiment of the second embodiment, the stationary diffractive optical element is a transmission diffractive optical element.

In another preferred embodiment of the second embodiment, the stationary diffractive optical element is a first diffractive optical element stationary in reflection.

According to another preferred embodiment of the second embodiment, the device further comprises a second diffractive optical element stationary in reflection such that said laser beam describes at least one reflection on each of the first and second diffractive optical elements in reflection, preferably at least two reflections on each of the first and second diffractive optical elements in reflection.

At least two reflections of the source beam on two diffractive optical elements allow for a better control of the separation of the plurality of separated laser beams. Also, this allows for a better control of the depth of field when the plurality of separated laser beams are subsequently focused. When desired, this embodiment of the invention allows for a much greater depth of field compared to the depth of field obtained when the beam simply interacts with a diffractive optical element.

Preferably, the spatial offsetting unit is configured such that each offset laser beam is capable of describing a circle around their respective main propagation axes A, in a plane perpendicular thereto.

In another embodiment, the spatial offsetting unit is configured such that each offset laser beam is capable of describing one or more lines in a plane perpendicular to their respective main propagation axes A. The line or the lines is located in a plane perpendicular to the main propagation axes A, regardless of the orientation of this line or these lines in that plane.

Preferably, the spatial offsetting unit is adapted to maintain a same polarisation between said plurality of collimated laser beams and said plurality of offset laser beams. Thus, the spatial offsetting unit is able to maintain a same polarisation between the plurality of collimated laser beams and the plurality of offset laser beams. This property of the spatial offsetting unit is particularly important because it allows spatially offsetting laser beams separated by separating means to use the polarisation of the light to separate them. Thus, this embodiment allows the spatial offset of separated laser beams that do not have a stationary polarisation in time to be changed.

Preferably, said spatial offsetting unit comprises:
a first lateral offsetting unit for obtaining a laser beam offset in a first direction X in a plane perpendicular to said main propagation axis A;
a second lateral offsetting unit for obtaining a laser beam offset in a second direction Y in a plane perpendicular to said main propagation axis A;
said directions X and Y being orthogonal to each other;
said first and said second lateral offsetting units are optically coupled so that they are capable of offsetting said plurality of collimated laser beams to obtain a plurality of offset laser beams, each offset laser beam being capable of describing a circle around their respective main propagation axes A, in a plane perpendicular to their main propagation axis A.

Preferably, said first and/or said second lateral offsetting unit comprises a blade adapted to be rotated so as to offset said plurality of collimated laser beams to obtain a collimated beam offset in a direction X and/or Y respectively in a plane perpendicular to said main propagation axes A.

Preferably, said first and/or said second lateral offsetting unit comprises:
a movable mirror so that its normal is able to describe a path in a two-dimensional space,
an optical return system configured to redirect a first input reflection on said movable mirror of the plurality of collimated laser beams towards said movable mirror so as to obtain for all possible positions and orientations of said movable mirror, an offset of each collimated laser beam along a direction X and/or Y respectively.

Preferably, the optical return system comprises:
a first and a second stationary mirror configured so that:
that a first input reflection of the plurality of collimated laser beams on said movable mirror is directed towards said first stationary mirror,
that a second reflection on said first stationary mirror is directed towards said second stationary mirror,
that a third reflection on said second stationary mirror is directed towards said movable mirror, and,
that a fourth output reflection on said movable mirror allows to obtain, for all possible positions and orientations of said movable mirror, an offset of each collimated laser beam along a first direction X or a second direction Y with respect to their respective main propagation axes A.

Preferably, the first and the second lateral offsetting unit each comprise:
a first movable mirror so that its normal is able to describe a path in a two-dimensional space;
a second movable mirror so that its normal is able to describe a path in a two-dimensional space;
the normal of the first and second movable mirrors being parallel for all the possible positions and orientations of the first and second movable mirrors, and, the first and second movable mirrors being configured so:

that a first input reflection of the plurality of collimated laser beams on said first movable mirror is directed towards said second movable mirror;

that a second reflection on said second movable mirror allows to obtain, for all the possible positions and orientations of said first and second movable mirrors, a plurality of beams laterally offset along a direction X;

that a third reflection of said plurality of laterally offset beams on said first movable mirror is directed towards said second movable mirror;

that a fourth reflection on said second movable mirror allows to obtain, for all the possible positions and orientations of said first and second movable mirrors of said first and second lateral offsetting units, a plurality of offset laser beams, each offset laser beam being able to describe a circle in a plane perpendicular to their respective main propagation axes A.

Preferably, the first and second lateral offsetting units are such that the first lateral offsetting unit is for obtaining a laser beam offset in a first direction X in a plane perpendicular to said main propagation axis A;

the second lateral offsetting unit is for obtaining a laser beam offset in a second direction Y in a plane perpendicular to said main propagation axis A;

said directions X and Y being orthogonal to each other;

said first and said second lateral offsetting units are optically coupled so that they are capable of offsetting said plurality of collimated laser beams to obtain a plurality of offset laser beams, each offset laser beam being capable of describing a circle around their respective main propagation axes A, in a plane perpendicular to their main propagation axis A.

Preferably, the first and second lateral offsetting units comprise a blade adapted to be rotated so as to offset said plurality of collimated laser beams to obtain a collimated beam offset in a direction X and/or Y respectively in a plane perpendicular to said main propagation axes A.

Preferably, the lateral offsetting unit comprises:

a first movable mirror so that its normal is able to describe a path in a two-dimensional space, a second movable mirror so that its normal is capable of describing a path in a two-dimensional space, and in that it comprises a blade positioned between said first and said second movable mirrors so that a first reflection on said first movable mirror is directed towards said second movable mirror by passing through said blade.

Preferably, the spatial offsetting unit comprises:

a first movable mirror so that its normal is able to describe a path in a three-dimensional space;

a second movable mirror so that its normal is able to describe a path in a three-dimensional space;

said normal of said first and second movable mirrors being parallel for all possible positions and orientations of said first and second movable mirrors, and, said first and second movable mirrors being configured so:

that a first input reflection of said plurality of collimated beams on said first movable mirror is directed towards said second movable mirror, that a second reflection on said second movable mirror allows to obtain, for all possible positions and orientations of said first and second movable mirrors, a plurality of offset laser beams, each laser beam offset spatially being capable of describing a circle in a plane perpendicular to their respective main propagation axes A.

Preferably, the spatial offsetting unit comprises:

a movable mirror so that its normal is able to describe a path in a three-dimensional space, an optical return system configured to redirect a first reflection of said plurality of collimated beams on said movable mirror, towards said movable mirror so as to obtain for all the possible positions and orientations of said movable mirror, a plurality of offset laser beams, each spatially offset laser beam being able to describe a circle in a plane perpendicular to their respective main propagation axes A.

Preferably, the optical return system is a retro-reflective system, preferably a retroreflector.

Preferably, said spatial offsetting unit comprises:

a mirror:

having a substantially planar reflection surface defined by a normal to provide a first plurality of reflected laser beams resulting from said plurality of collimated laser beams, movable such that its normal is able to describe a path in a three-dimensional space;

said spatial offsetting unit being configured so that said plurality of collimated laser beams and said normal of said mirror are separated by an angle between 0° and 15°, preferably between 0.01° and 10°, preferably between 0.1° and 8° and even more preferably between 0.1° and 3°, for all possible positions and orientations of said movable mirror;

driving means for displacing said movable mirror;

a retro-reflective system:

positioned with respect to the movable mirror to obtain from the first plurality of reflected laser beams, a second plurality of laser beams incident to the movable mirror for all positions and orientations of said movable mirror, to obtain the plurality of offset laser beams from a reflection of the second plurality of laser beams incident to the movable mirror, and capable of providing the second plurality of laser beams incident to the movable mirror, parallel to the first plurality of reflected laser beams for all the possible positions and orientations of the movable mirror.

Preferably, the optical device comprises an assembly of alignment and/or resizing optics of the source beam located upstream of the matrix optical modulation means. Such an alignment and/or resizing optics assembly allows an optimal exploitation of the separating means and in particular of the matrix optical modulation means and for example of a matrix optical beam modulator.

Preferably the dimensions of the source laser beam allow a large segment of the active surface of the matrix optical modulator to be illuminated. In general the dimensions of the source laser beam are smaller than the dimensions of the matrix optical beam modulator. For example, the source laser beam has a diameter of between 5 mm and 10 mm on the matrix optical modulation means. Preferably, the source laser beam allows to illuminate more than 75% of the active surface area of the matrix optical modulator, more preferably more than 80%.

Thus, one of the purposes of the present invention is to propose an optical system that allows a fast and high quality machining on a same part.

For this purpose, the inventors propose an optical system for laser machining comprising:

an ultra-short pulse laser source to generate a source laser beam;

a device described above;

focusing means configured to focus each offset laser beam onto a workpiece.

The various variants and advantages described for the device apply to the optical system, mutatis mutandis.

Preferably, the optical system of the invention further comprises a system for adjusting the collimation that allows for easier adaptation to different target, sample thicknesses. Preferably, the laser source allows to generate a coherent laser beam. Even more preferably, the ultra-short pulse laser source is capable of emitting a collimated source beam with a stationary polarisation in time.

According to yet another aspect, one of the purposes of the present invention is to proposes a method for generating laser beams allowing a fast and high quality machining on a same part.

To this end, the inventors propose a method for providing a plurality of offset laser beams with respect to a plurality of separated laser beams for machining a part and comprising the following steps:

a) providing an ultra-short pulse laser source to generate a source laser beam;
b) providing separating means controlled by a control unit;
c) providing a spatial offsetting unit and focusing means;
d) controlling said separating means to separate a source laser beam into a plurality of separated laser beams, each of the separated laser beams being capable of propagating along different propagation axes;
e) activating said spatial offsetting unit to produce from a plurality of separated laser beams a plurality of offset laser beams, such that each offset laser beam is capable of propagating around a main propagation axis A and is capable of describing a movement around the main propagation axis A
f) focusing each offset laser beam on a workpiece in the direction of its own propagation axis by means of the focusing means.

The source laser beam is preferably a coherent laser beam. Preferably, the source laser beam has a stationary polarisation in time. Preferably, the separating means are matrix modulation means, and even more preferably, matrix phase modulation means.

The different variants and advantages described for the device and for the optical system apply to the method, mutatis mutandis.

Preferably, the separating means comprises a matrix of pixels controlled to display a phase modulation map so that an interaction of said source laser beam with said phase modulation pattern generates said plurality of separated laser beams.

Preferably, the modulation pattern is configured to separate the source laser beam into nine separated beams.

BRIEF DESCRIPTION OF THE FIGURES

These aspects and other aspects of the invention will be clarified in the detailed description of particular embodiments of the invention, reference being made to the drawings of the figures, in which:

FIG. 1 shows an embodiment of the device of the system according to the invention;

FIG. 2 shows an embodiment of the device of the system according to the invention;

FIGS. 4a, 4b, 4c, 4d, 4e, 5a, 5b, 5c, 5d, 5e show embodiments of the spatial offsetting unit comprised in the device; and FIGS. 6, 7A, 7B, 8A, 8B show embodiments of the separating means comprised in the device.

The drawings in the figures are not to scale. Generally, similar elements are denoted by similar references in the figures. The presence of reference numbers in the drawings shall not be considered limiting, even when such numbers are indicated in the claims.

DETAILED DESCRIPTION OF SOME EMBODIMENTS OF THE INVENTION

Figure 3:
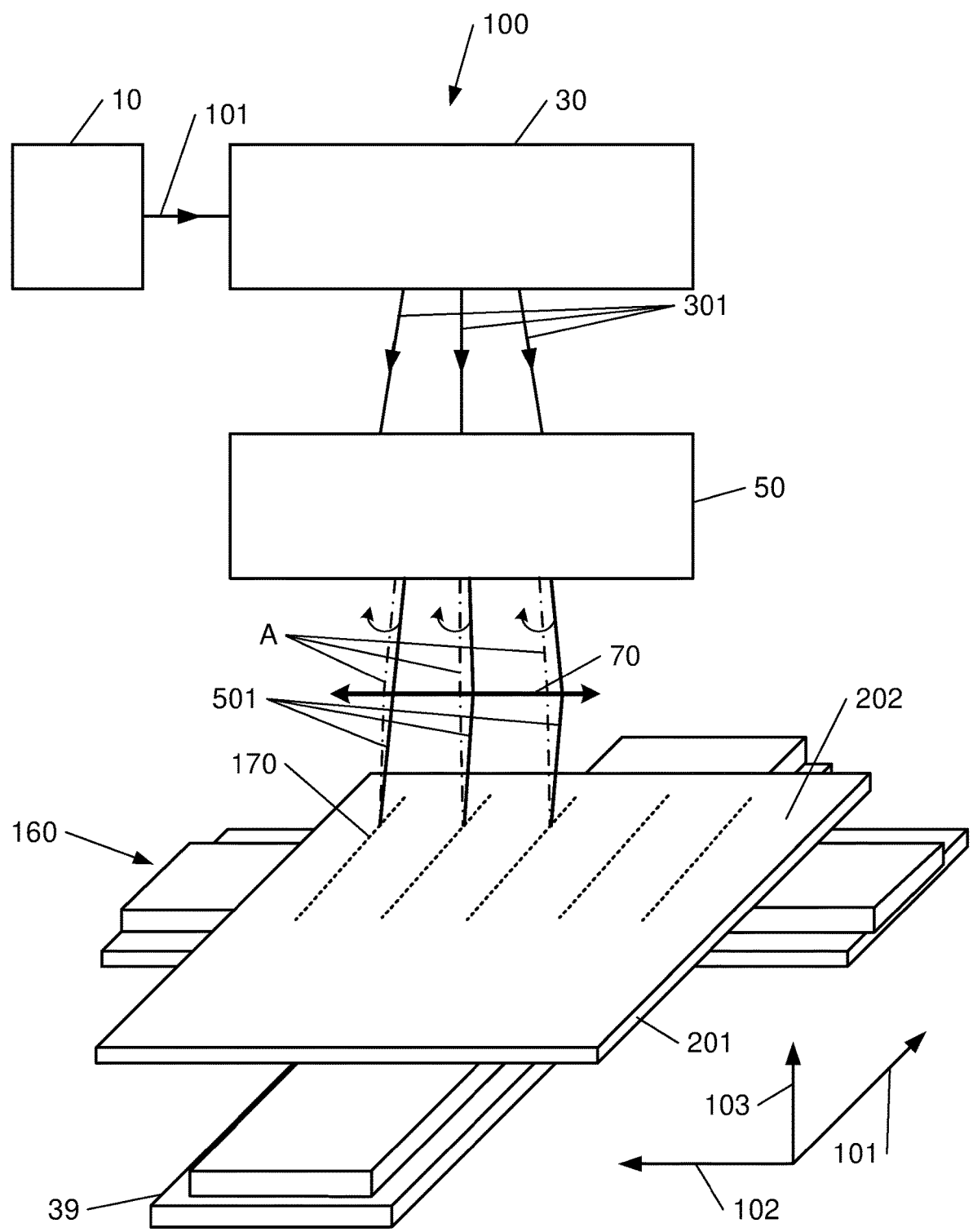
FIG. 3 shows an embodiment of the system according to the invention.

FIGS. 1 and 2 show examples of embodiments of the optical device 1 of the system of the invention. The optical device 1 comprises separating means 30 for separating a source laser beam 101 into a plurality of separated laser beams 301. The source laser beam is preferably generated by a laser source 10. Preferably, the source laser beam 101 is a collimated laser beam. The plurality of separated laser beams 301 is achieved by the separating means 30 which allows the source laser beam 101 to be separated into a plurality of separated laser beams 301 towards the spatial 50 or lateral 50x, 50y offsetting unit. Preferably, the separating means 30 allows the collimated appearance of the plurality of separated laser beams 301 to be maintained. The plurality of separated laser beams 301 after their separation by the separating means 30 are not parallel to each other. For example, the plurality of separated laser beams 301 after their separation by the separating means 30 are not parallel to the propagation direction of the source laser beam 101.

FIG. 1 shows an optical device 1 comprising a lateral offsetting unit 50X, 50Y for obtaining from said plurality of separated laser beams 301, a plurality of offset laser beams 501 according to a linear translation in a plane perpendicular to said main propagation axis A as indicated by the double arrow (whose direction in the figure plane is given as an example). The linear translation is achieved on either side of a main propagation axis A for each offset laser beam 501. Each laser beam is laterally offset in one direction around the main propagation axis A. Each offset laser beam describes a movement—for example according to the double arrow—around the main propagation axis A. The movement of each laser beam is along one or more lines in a plane perpendicular to the respective main propagation axes A. The line or the lines are located in a plane perpendicular to the main propagation axes A, regardless of the orientation of this line or these lines in that plane.

FIG. 2 shows an optical device 1 comprising a spatial offsetting unit 50 for obtaining from said plurality of separated laser beams 301, a plurality of offset laser beams 501, each offset laser beam being offset in a circular translation in a plane perpendicular to said main propagation axis A as indicated by the curved arrow. Each laser beam is laterally offset around the main propagation axis A. Each offset laser beam describes a movement according to the curved arrow around the main propagation axis A. The movement of each laser beam is in a circle around their respective main propagation axes A, in a plane perpendicular thereto.

FIG. 3 shows an embodiment of the system 100 of the invention. The optical machining system 100 comprises separating means 30 for separating (shaping) the source laser beam 101 into a plurality of separated laser beams 301. As the source laser beam 101 is preferentially collimated, the separating means 30 allows an acceptable collimation to be maintained so that each of the separated laser beams of the plurality of separated laser beams 301 can be considered collimated. The plurality of separated laser beams 301 is then directed towards the spatial (lateral) offsetting unit 50 adapted to spatially (laterally) offset each beam of the plurality of separated beams 301. In FIG. 3 is shown a spatial offset according to a circle in a plane perpendicular to a main propagation axis A. The particularity of this spatial (lateral) offsetting unit 50 is to allow a conservation of a same polarisation between the plurality of separated laser beams 301 and the plurality of offset laser beams 501. The optical machining system 100 also comprises focusing means 70—preferably a single optical element common to all the offset beams and preferably telecentric—for focusing the plurality of offset laser beams onto a workpiece 202, such that each offset laser beam is focused in the direction of its own propagation axis. Downstream of the focusing means 70, the angle between each of the offset laser beams and a normal of the upper surface of the workpiece is non-zero (or different from 0°). The spatial offset, preferably the rotational movement of each of the beams constituting the plurality of offset laser beams 501 around their own axis of propagation, is generated by the spatial offsetting unit 50 upstream of the focusing means 70, thereby allowing to provide a attack angle on the part and produce a precession movement of each beam of the plurality of offset laser beams 501 downstream of the focusing means 70. The precession movement of each of the offset laser beams 501 is preferably produced at a point, a spot or a small surface area on a substrate 201 intended to be structured or machined. The precession movement is illustrated in FIGS. 2, 3, 4a, 4b, 5a, 5b, 5c, 5d, 5e by arrows describing a segment of a circle (around the propagation axis not shown). Finally, the system 100 comprises displacing means 160 allowing to displace at least one portion or part 202 relative to the plurality of offset laser beams 501. The displacing means 160 allow, for example, to displace the substrate in the directions 101, 102 and 103. The directions 101, 102 and 103 preferably define a three-dimensional Cartesian coordinate system. The directions 101 and 102 defining for example a direction X and a direction Y. According to a preferred embodiment, the direction Z 103 defines the direction of the main axis A and corresponds to a normal to the upper surface of the part. In FIG. 3, the plurality of offset laser beams 501 are focused by the focusing means 70, so that the attack angle of the offset laser beams 501 on the workpiece 202 is not parallel to a normal of the upper surface of the part 202. This allows to obtain straight or controlled conicity piercing or cutting faces. In FIG. 3, the system 100 of the invention allows the machining of closely spaced positions on a (single) workpiece 202. In fact, thanks to the combination of the separating means 30 and the spatial offsetting unit 50, it is possible to simply obtain a plurality of offset beams 501 which are each very close to each other. This allows a segment of the part to be machined with several laser beams simultaneously. This is particularly advantageous when machining repetitive patterns on a part segment, for example a surface structuring/texturing. Another example where the system of the invention is particularly advantageous concerns the piercing of holes in a segment of a part 202, preferably of a mesh of holes pierced simultaneously. With the system of the invention, complex shaped holes can be done while ensuring a high quality of piercing, with holes with edges perpendicular to the surface of a substrate. The description and the advantages of the example embodiment of FIG. 3 corresponding to the device of FIG. 2 are also applicable to a (lateral) offset according to one or more linear translations in a plane perpendicular to said main propagation axis A. The offset is along one or more lines located in a plane perpendicular to the main propagation axes A, irrespective of the orientation of this line or these lines in this plane (e.g. in the direction indicated by the double arrow in FIG. 1). In particular, with the device 1 of FIG. 1 applied to the system of FIG. 3, the focusing means 70—preferably a single and preferably telecentric optical element—focus the plurality of offset laser beams on the (single) workpiece 202, so that each of the offset laser beams is focused in the direction of its own propagation axis. Downstream of the focusing means 70, the attack angle between each of the offset laser beams and a normal of the upper surface of the workpiece is non-zero (or different from 0°). The plurality of offset laser beams 501 are focused by the focusing means 70, so that the attack angle of the offset laser beams 501 on the workpiece 202 is not parallel to a normal of the upper surface of the part 202; this therefore allows to obtain straight or with a controlled conicity piercing or cutting faces.

According to an example embodiment, the invention is particularly well suited for structuring substrates with patterns having a negative conicity, for example lines having a negative conicity. Such negative conicity lines are particularly advantageous for assembling applications by mechanical anchoring where a meltable material of a part to be assembled is then melted into the negative conicity groove and cooled in order to obtain a good mechanical anchoring.

FIG. 4a shows an embodiment of a spatial (lateral) offsetting unit 50. In this embodiment, the separated laser beam 301 in the lateral offsetting unit 50 is a laser beam generated by a laser source 10 and preferably travelling outside the lateral offsetting unit 50 before entering it. The lateral offsetting unit 50 comprises a mirror 119 which allows a first reflected laser beam 123 to be obtained by reflection of the incident laser beam 14. The lateral offsetting unit 50 also comprises a retro-reflective system 121 that allows the first reflected laser beam 123 to be redirected onto the mirror 119. In other words, the second incident laser beam 18 towards the mirror 119 is obtained by passing the first reflected laser beam 123 through the retro-reflective system 121. The second incident laser beam 18 is then reflected by the mirror 119 and forms a plurality of offset laser beams 501. For example, the lateral offsetting unit 50 is configured such that the offset laser beam 501 can be spatially offset relative to the separated laser beam 301 while remaining parallel to the direction of the separated laser beam 301 upstream of the focusing means 70. In the example shown in this embodiment, the separated laser beam 301 and the offset laser beam 501 are transversely offset. Preferably, the mirror 119 is fully rotatable around an axis of rotation 150 and driving means 16 allows to rotate the mirror 119 around its axis of rotation 150. The lateral offsetting unit 50 is configured so that the first incident laser beam 301 and the normal 126 to the mirror 19 are separated by an angle 115 of between 0° and 150 for all possible positions and orientations of the movable mirror 119. This angle 115 is not shown to scale in FIG. 4a for reasons of clarity of the figure. The spatial offsetting unit 50 is configured such that a change in position between the mirror 119 and the retro-reflective system 121 allow to induce a variation in the offset between the separated 301 and offset 501 laser beams.

In FIG. 4a, depending on the angular position of the movable mirror 119, the offset laser beam 501 will follow a different path. Preferably each of the paths of the offset laser beam 501 obtained for each of the angular positions of the movable mirror 119 are parallel. The optical machining system also comprises focusing means 70 for focusing each offset laser beam 501 after the lateral offset (around its own main propagation axis A) of the plurality of beams 501 offset by the spatial offsetting unit 50 onto a portion or a workpiece 201. The rotational movement of each of the offset laser beams 501 around the main propagation axis A generated by the rotation of the mirror 119 upstream of the focusing means 70 allows the precession movement of the offset laser beam 501 to be produced downstream of the focusing means 70; downstream of the focusing means 70, each offset laser beam is focused on the workpiece in the direction of its own propagation axis. The precession movement of each of the offset laser beams 501 is preferably produced at a point, a spot or a small surface area on a substrate 201 intended to be structured or machined. Thus, the attack angle of the offset laser beams 501 on the workpiece 202 is not parallel to a normal of the upper surface of the part 202; this therefore allows to obtain straight or with a controlled conicity piercing or cutting faces.

The precession movement is illustrated in FIGS. 2, 3, 4a, 4b, 5a, 5b, 5c, 5d and 5e by arrows describing a segment of a circle. The movement of the offset laser beam 501 along a line (or several lines) is illustrated by a double arrow in FIG. 1, 4c, 4d, 4e.

FIG. 4b shows a spatial offsetting unit 50 for spatially offset an incoming laser beam 301 (301') into an offset laser beam 501 (501') having a main propagation axis A and capable of describing a circle in a plane perpendicular to this main propagation axis A. This spatial offsetting unit 50 comprises a first lateral offsetting unit 50X and a second lateral offsetting unit 50Y configured such that:

the first lateral offsetting unit 50X allows to offset the incoming beam 301 (301') into a laterally offset beam 302 (302') along a direction X or Y in a plane perpendicular to the main propagation axis A, and, the second lateral offsetting unit 50Y allows the laterally offset beam 302 (302') to be offset in the direction X or Y not offset by the first lateral offsetting unit 50X into an offset beam 501 (501') having a main propagation axis A and capable of describing a circle in a plane perpendicular to this main propagation axis A.

The laterally offset beam 302 (302') is capable of displacing in a line in a plane perpendicular to this main propagation axis A.

FIG. 4c shows a (first or second) lateral offsetting unit 50X, 50Y comprising a blade 410 having a refractive index greater than air or vacuum. The blade 410 is tilted (i.e. steerable around an axis) so that for all its orientations, the separated laser beams 301 or the laterally offset beams 302 are transmitted through the blade 410. When the blade 410 is tilted from a first position towards a second position, the separated laser beams 301 and/or the laterally offset laser beams 302 are offset laterally in a line, or in a circle if the beam 302 was already offset in a line when it passed through the blade 410. The tilting is the act of tilting the blade 410 so that the separated laser beams 301 or the laterally offset beams 302 have a varying angle of incidence on the blade 410. The rounded arrow represents schematically the path of the tilt of the blade 410. The solid line blade 410 represents a first blade position and the dashed line blade 410 represents a second position of the blade 410. The tilt of the blade 410 is generated between the first and the second blade position 410. The separated laser beams 301 or the laterally offset laser beams 302 when offset by the blade 410 in the first position are shown in solid lines and when offset by the blade 410 in dashed lines are shown in dashed lines. The main propagation axis A is not shown.

FIG. 4d shows (first or second) lateral offsetting unit 50X, 50Y comprising a movable mirror 401 (the movable mirror is preferably tiltable, i.e. steerable around an axis), a first 402 and a second 403 stationary mirror configured so:

that a first input reflection of a separated laser beam 301 or a laterally offset beam 302 on the movable mirror 401 is directed towards the first stationary mirror 402, that a second reflection on the first stationary mirror 402 is directed towards the second stationary mirror 403, that a third reflection on the second stationary mirror 403 is directed towards the movable mirror 401, and, that a fourth output reflection on said movable mirror 401, allows to obtain for all possible positions and orientations of the movable mirror, a laser beam offset 302, 501 according to a direction X or Y, or X and Y respectively. In this embodiment, the laser beams resulting from the reflections on the movable mirror 401 and the second 402 and third 403 mirrors are for example in a same plane. In this embodiment, the orientations of the mirrors can be adjusted to modify the paths of the separated 301, or laterally offset 302 or offset 501 laser beams. The main propagation axis A is not shown.

FIG. 4e shows a (first or second) lateral offsetting unit 50X, 50Y comprising a first movable mirror 421X, 421Y and a second movable mirror 422X, 422Y such that their normal are able to describe a path in a two-dimensional space. The first 421X, 421Y and second 422X, 422Y movable mirrors are movable so that their surfaces or theirs normal are always parallel. The displacement of the first 421X (421Y) and second 422X (422Y) movable mirrors is synchronised. In a preferred embodiment, the first 421X (421Y) and second 422X (422Y) movable mirrors are displaced so that their respective surfaces are always parallel. Thus, for any displacement of the movable mirrors 421X, 421Y (422X, 422Y), the laterally offset 302, or offset 501 beams are always parallel to each other. A separated laser beam 301 or a laterally offset beam 302 directed towards the first movable mirror 421X (422X) undergoes a first input reflection of the laser beam on said first movable mirror 421X (421Y), this reflection is directed towards said second movable mirror 422X (422Y), so that a second reflection on the second movable mirror 422X (422Y) allows to obtain a laterally offset 302, or offset 501 laser beam. The laterally offset 302, or offset 501 laser beam is obtained for all possible positions and orientations of said first 421X (421Y) and second 422X (422Y) movable mirrors. The beam offset achieved by the first 50X or by the second 50Y lateral offsetting unit is preferably along a line, i.e. the movement or scanning of the laterally offset laser beam 302 occurs along a line. The main propagation axis A is not shown.

Figure 5A:
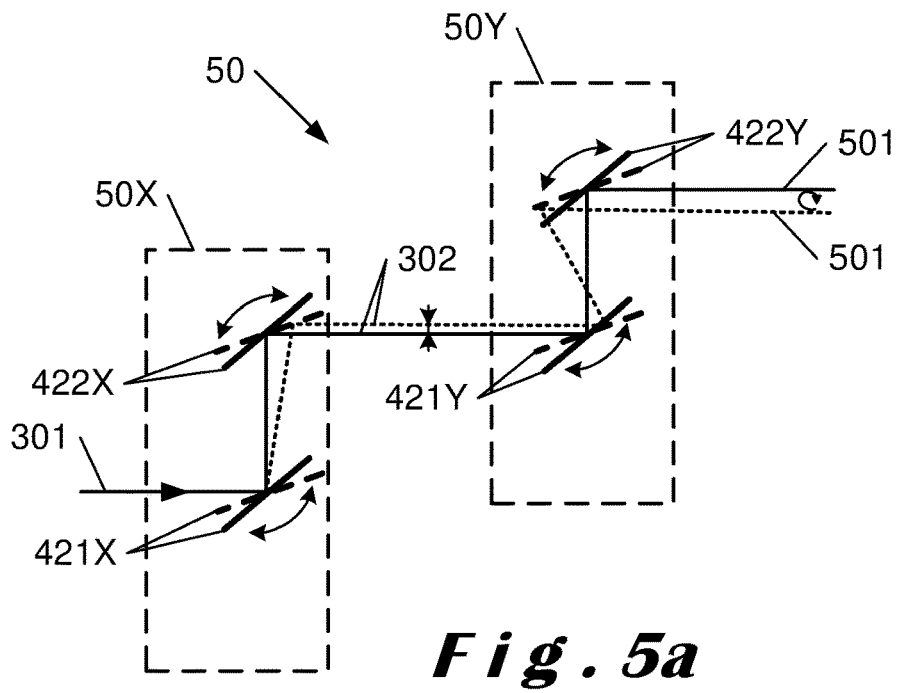

FIG. 5a shows an embodiment of a spatial offsetting unit 50 comprising a first 50X and a second 50Y lateral offsetting units as described in FIG. 4e. The separated laser beam 301 is laterally offset by the first lateral offsetting unit 50X into a laterally offsetting beam 302. The laterally offset beam 302 is offset such that for all positions of the first 421X and second 421Y mirrors, the laterally offset beam 302 sweeps a straight line. This straight line follows a first axis X in a plane perpendicular to the propagation of the laterally offset beam 302. The laterally offset beam 302 then enters a second lateral offsetting unit 50Y allowing it to be offset in a second direction Y which has preferably not been offset by the first lateral offsetting unit 50X. The laterally offset beam 302 is then laterally offset by the second lateral offsetting unit 50Y, into a spatially offset beam 501 as a result of the reflection of the laterally offset beam 302 on the first 421Y and second 422Y movable mirrors of the second lateral offsetting unit 50Y. The resulting spatially offset beam 501 can describe a circle in a plane perpendicular to the main propagation axis A (not shown), when the first 50X and second 50Y lateral offsetting units are controlled in a coordinated manner. This embodiment allows a same polarisation to be maintained between the separated source laser beam 301 and the spatially offset laser beam 501.

Figure 5B:
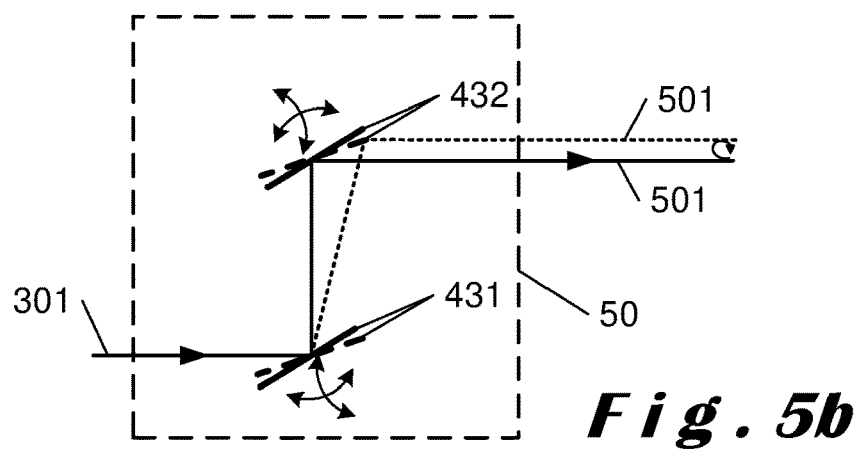

FIG. 5b shows an embodiment of a spatial offsetting unit 50 comprising a first movable mirror 431 and a second movable mirror 432 so that their normal are able to describe a path in a three-dimensional space. The first 431 and second 432 movable mirrors are movable so that their surfaces or their normal are always parallel. An incoming separated source beam 301 directed towards the first movable mirror 431 undergoes a first input reflection of the laser beam on said first movable mirror 431, this reflection is directed towards said second movable mirror 432, so that a second reflection on said second movable mirror 432 allows to obtain a spatially offset laser beam 501 having a main propagation axis A (not shown), said spatially offset laser beam 501 being capable of describing a circle around the main axis A in a plane perpendicular to this main propagation axis A. The offset laser beam 501 is obtained for all possible positions and orientations of said first 431 and second 432 movable mirrors. The resulting beam offset preferably describes a circle, i.e. a movement or scanning of the offset laser beam 501 occurs around a circle. Preferably, the normal of the first 431 and second 432 movable mirrors each describe a circle as the mirror 431, 432 displaces. This embodiment allows a same polarisation to be maintained between said separated source beam 301 at the input and the spatially offset laser beam 501 at the output.

Figure 5C:
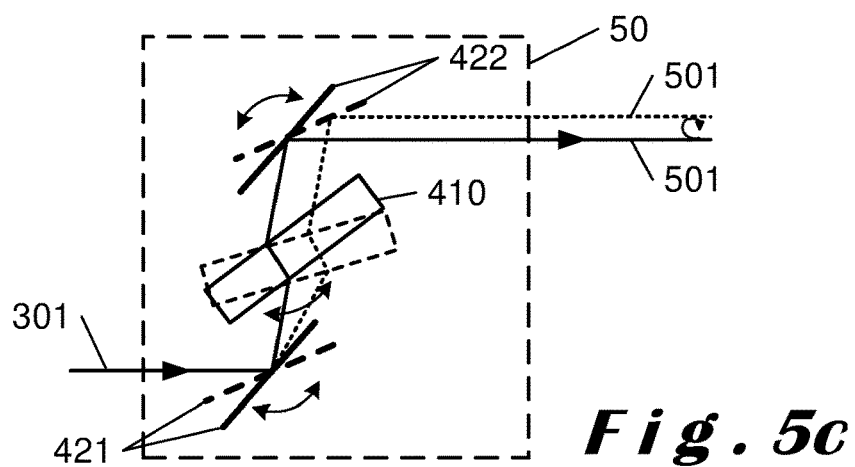

FIG. 5c shows an embodiment of a spatial offsetting unit 50 comprising the lateral displacement unit 50X, 50Y of FIG. 4e in which a tiltable blade 410 is inserted between the first 421 and second 422 movable (tiltable) mirrors—tiltable meaning steerable around an axis. Thus the first 421 and second 422 tiltable mirrors allow the laser beam to be displaced in a direction X or Y, the tiltable blade then allows the same laser beam to be displace in a direction Y or X respectively. This configuration could be envisaged by positioning the blade 410 upstream of the first movable mirror 421 or downstream of the second movable mirror 422. The configuration shown in FIG. 5c is nevertheless particularly compact. The combination of the two movable (tiltable) mirrors 421, 422 and the movable (tiltable) blade 410 allows to obtain a spatially offset laser beam having a main propagation axis A (not shown) and being capable of describing a circle around the main axis A in a plane perpendicular to this main propagation axis A, thanks to the synchronisation of the displacements of the first 421 and second 422 movable mirrors and movable blade 410. This embodiment allows to maintain a same polarisation between the source laser beam 101 at the input and the spatially offset laser beam 501 at the output. Preferably, the embodiment shown in FIG. 5c is a combination of the embodiments of FIGS. 4c and 4e.

Figure 5D:
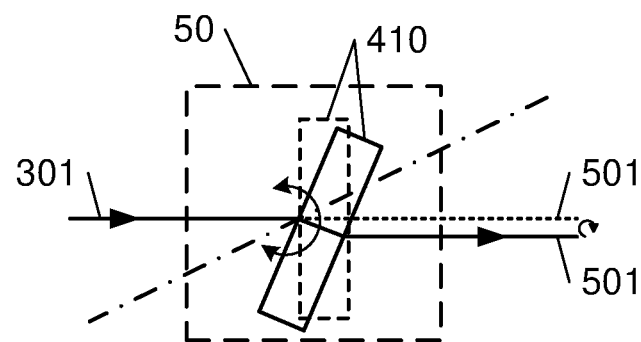

FIG. 5d shows an embodiment of a spatial offsetting unit 50 comprising an improvement of the lateral offsetting unit 50X, 50Y shown in FIG. 4c. The improvement is located at the level of the set in movement of the blade 410. In this embodiment of FIG. 5d, the blade 410 is set in movement so that its normal describes a path in a three-dimensional space, for example such that its normal describes a circle. For example, its normal describes a circle around an axis passing through the point of incidence of a separated beam 301 with the blade 410. The axis is not parallel to the separated beam 301, i.e. not coincident with the separated beam 301. Such an axis is represented by the dotted line. This embodiment of a spatial offsetting unit 50 which allows to provide a plurality of spatially offset laser beams 501, having a main propagation axis A and being capable of describing a circle around the main axis A in a plane perpendicular to this main propagation axis A, in particular when the normal of the blade 410 describes a circular path around the axis. This embodiment allows a same polarisation to be maintained between said source laser beam 101 and the spatially offset laser beam 501.

Figure 5E:
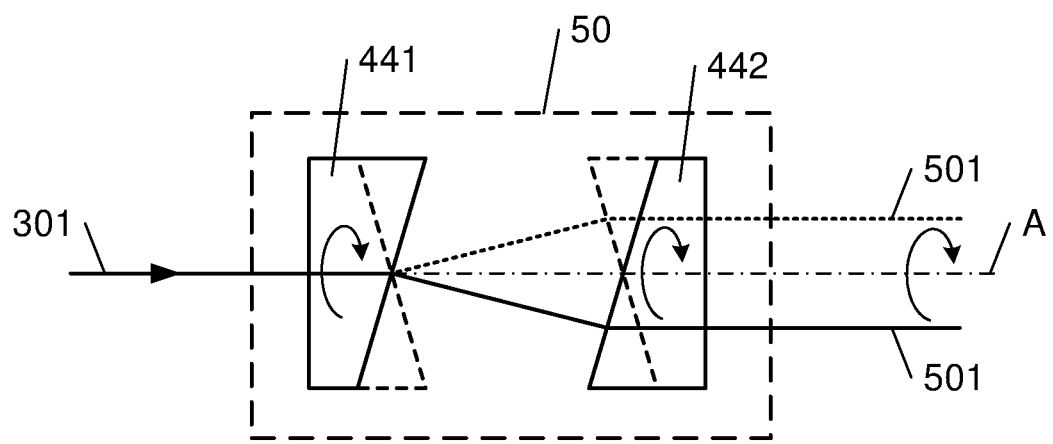

FIG. 5e shows an embodiment of a spatial offsetting unit 50 comprising a first wedge prism 441 and a second wedge prism 442, each of the two wedge prisms 441, 442 being capable of being rotated around an axis as shown in FIG. 5e. The two wedge prisms 441, 442 are rotated synchronously. Preferably, they are rotated so that the sum of their thicknesses at any point in a direction parallel to their axis of rotation is equal. Preferably the two wedge prisms 441, 442 have identical wedge prism angles. Thus, the passage of the laser beam through the two wedge prisms 441, 442 during their synchronised rotations allows to obtain a spatially offset laser beam 501 having a main propagation axis A and being capable of describing a circle around the main axis A in a plane perpendicular to this main propagation axis A. This embodiment allows to maintain a same polarisation between the separated laser beam 301 at the input and the spatially offset laser beam 501 at the output.

FIG. 6 shows separating means 30 comprising a first reflection diffractive optical element 37 and a second reflection diffractive optical element 38. The first 37 and the second 38 reflection diffractive optical elements each comprise a diffraction grating for diffracting a laser beam in reflection. The source laser beam 101 is directed towards the diffraction grating of the first reflection diffractive optical element 37, the diffracted and reflected beam is then directed towards the second reflection optical element 38 or it is further diffracted and reflected into a plurality of separated laser beams 301. In another embodiment of the separating means of FIG. 6, the source laser beam 101 is reflected and diffracted at least twice on each of the first 37 and second 38 diffractive optical elements in reflection so that a plurality of separated laser beams 301 is generated by the separating means 30. At least two reflections of the source beam 101 allow a better control of the separation of the plurality of separated laser beams 301, and in particular a better control of the depth of field when the plurality of separated laser beams 301 are subsequently focused.

FIG. 7A shows separating means 30 comprising a transmission diffractive optical element 36. A transmission diffractive element 36 comprises a diffraction grating on at least one of its surfaces. For example, a transmission diffractive element 36 is made of a material transparent to the source laser beam 101. The transmission diffractive element 36 allows to diffract the source laser beam 101 into a plurality of separated laser beams 301. Each of the plurality of separated laser beams 301 then propagates in its own direction. For example, two separated laser beams have directions that describe an angle α between them.

FIG. 7B shows separating means 30 comprising a reflection diffractive optical element 37. A reflection diffractive element 37 comprises a diffraction grating on its reflective surface. The reflection diffractive element 37 allows to diffract the source laser beam 101 into a plurality of separated laser beams 301. Each of the beams of the plurality of separated laser beams 301 then propagates in its own direction. For example, two separated laser beams have directions that describe an angle α between them.

FIG. 8A shows separating means 30 comprising transmission matrix modulation means 35. For example, it is a liquid crystal filter. A transmission matrix modulation means 35 comprises a matrix of pixels through which the source laser beam 101 can pass. For example, the pixel matrix is configured to display a phase modulation map (a diffractive pattern) allowing to diffract the source laser beam 101 upon the transmission thereof through the displayed phase modulation map into a plurality of separated laser beams 301. Each of the beams of the plurality of separated laser beams 301 then propagates in its own direction. For example, two separated laser beams have directions that describe an angle α between them.

FIG. 8B shows separating means 30 comprising reflection matrix modulation means 39. For example, a liquid crystal on silicon (LCOS) matrix. A reflection matrix modulation means 39 comprises a matrix of pixels allowing to reflect the source laser beam 101. For example, the pixel matrix is configured to display a phase modulation map (a diffractive pattern) allowing to diffract the source laser beam 101, upon the reflection thereof on the displayed phase modulation map, into a plurality of separated laser beams 301. Each of the beams of the plurality of separated laser beams 301 then propagates in its own direction. For example, two separated laser beams have directions that describe an angle α between them.

The present invention has been described above in connection with specific embodiments, which are illustrative and should not be considered limiting. In general, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

In summary, the invention can also be described as follows. The optical system for laser machining according to the invention makes it easier and more robust to machine several patterns simultaneously on the same part. The system comprises:
  an ultra-short pulse laser source 10 for generating a source laser beam 101;
  a device 1 with
    separating means 30, for separating a source laser beam 101 into a plurality of separated laser beams 301, such that each of the separated laser beams 301 is directed along its own propagation direction;
    a spatial offsetting unit 50, 50X, 50Y for obtaining from said plurality of separated laser beams 301, a plurality of offset laser beams 501 such that each offset laser beam 501 can propagate around its own main propagation axis A, and is capable of describing a movement around the main propagation axis A;
    focusing means 70 configured to focus each offset laser beam onto a workpiece 201 in the direction of its own propagation axis.

The invention claimed is:
1. An optical system for laser machining, comprising:
  an ultra-short pulse laser source for generating a source laser beam;
  a device with
    a separator configured to separate the source laser beam into a plurality of separated laser beams, so that each of the separated laser beams is directed on its own direction of propagation;
    a spatial offsetting unit for obtaining from the plurality of separated laser beams, a plurality of offset laser beams so that each offset laser beam can propagate around its own main propagation axis A and is capable of describing a movement around the main axis of propagation A; and
    an optical element configured to focus each offset laser beam on a workpiece in the direction of its own axis of propagation.

2. The system according to claim 1, wherein each of the offset laser beams of the plurality of offset laser beams can propagate around main propagation axes A, the main propagation axes A describing non-zero angles α with each other.

3. The system according to claim 2, wherein each of the main propagation axes A of the offset laser beams describes an angle between 0.005° and 1° with respect to a main propagation axis A adjacent thereto.

4. The system according to claim 1, wherein the separator is chosen amongst a transmission matrix configured to modulate, a reflection matrix configured to modulate, a phase matrix configured to perform phase modulation, and a reflection phase matrix configured to perform phase modulation.

5. The system according to claim 4, wherein the reflection phase matrix are an LCOS, in that it is adapted to separate the source laser beam into the plurality of separated laser beams.

6. The system according to claim 1, wherein the separator comprises a stationary diffractive optical element for the beam shaping.

7. The system according to claim 6, wherein the stationary diffractive optical element is a transmission diffractive optical element or a first diffractive optical element stationary in reflection.

8. The system according to claim 7, wherein the stationary diffractive optical element further comprises a second diffractive optical element stationary in reflection so that the laser beam describes at least one reflection on each of the first and second diffractive optical elements in reflection.

9. The system according to claim 1, wherein the spatial offsetting unit is configured such that each offset laser beam is capable of:
  describing a circle around their respective main propagation axes A, in a plane perpendicular to them.

10. The system according to claim 9, wherein the first and/or the second lateral offsetting unit comprises:
  a movable mirror so that its normal is able to describe a path in a two-dimensional space; and
  an optical return system configured to redirect a first input reflection on the movable mirror of the plurality of collimated laser beams towards the movable mirror so as to obtain for all possible positions and orientations of the movable mirror, an offset of each collimated laser beam in a direction X and/or Y respectively.

11. The system according to claim 9, wherein the first and the second lateral offsetting unit each comprise:
  a first movable mirror so that its normal is able to describe a path in a two-dimensional space; and
  a second movable mirror so that its normal is able to describe a path in a two-dimensional space;
the normal of the first and second movable mirrors being parallel for all the possible positions and orientations of the first and second movable mirrors, and, the first and second movable mirrors being configured so:
    that a first input reflection of the plurality of separated laser beams on the first movable mirror is directed towards the second movable mirror;
    that a second reflection on the second movable mirror allows to obtain, for all the possible positions and orientations of the first and second movable mirrors, a plurality of beams laterally offset in a direction X;
    that a third reflection of the plurality of laterally offset beams on the first movable mirror is directed towards the second movable mirror; and
    that a fourth reflection on the second movable mirror allows to obtain, for all possible positions and orientations of the first and second movable mirrors of the first and second lateral offsetting units, a plurality of offset laser beams, each offset laser beam being able to describe a circle in a plane perpendicular to their respective main propagation axes A.

12. The system according to claim 1, wherein the spatial offsetting unit is configured such that each offset laser beam is capable of:
    describing one or more lines in a plane perpendicular to their respective main propagation axes A.

13. The system according to claim 1, wherein the spatial offsetting unit is adapted to maintain a same polarisation between the plurality of separated laser beams and the plurality of offset laser beams.

14. The system according to claim 1, wherein the spatial offsetting unit comprises:
    a first lateral offsetting unit for obtaining a laser beam offset in a first direction X in a plane perpendicular to the main propagation axis A; and
    a second lateral offsetting unit for obtaining a laser beam offset in a second direction Y in a plane perpendicular to the main propagation axis A;
    the directions X and Y being orthogonal to each other; and
    the first and the second lateral offsetting units are optically coupled such that they are capable of offsetting the plurality of separated laser beams to obtain a plurality of offset laser beams, each offset laser beam being capable of describing a circle around their respective main propagation axes A, in a plane perpendicular to their main propagation axis A.

15. The system according to claim 14, wherein first and/or the second lateral offsetting unit comprises a blade adapted to be rotated so as to offset the plurality of separated laser beams to obtain a collimated beam offset in a direction X and/or Y respectively in a plane perpendicular to the main propagation axes A.

16. The system according to claim 1, wherein the lateral offsetting unit comprises:
    a first movable mirror so that its normal is able to describe a path in a two-dimensional space; and
    a second movable mirror so that its normal is capable of describing a path in a two-dimensional space, and in that it comprises a blade positioned between the first and the second movable mirror so that a first reflection on the first movable mirror is directed towards the second movable mirror by passing through the blade.

17. The system according to claim 1, wherein the spatial offsetting unit comprises:
    a first movable mirror so that its normal is able to describe a path in a three-dimensional space; and
    a second movable mirror so that its normal is able to describe a path in a three-dimensional space; the normal of the first and second movable mirrors being parallel for all possible positions and orientations of the first and second movable mirrors, and, the first and second movable mirrors being configured so:
    that a first input reflection of the plurality of separated beams on the first movable mirror is directed towards the second movable mirror, and that a second reflection on the second movable mirror allows to obtain, for all possible positions and orientations of the first and second movable mirrors, a plurality of offset laser beams, each laser beam offset spatially being capable of describing a circle in a plane perpendicular to their respective main propagation axes A.

18. The system according to claim 1, wherein the spatial offsetting unit comprises:
    a movable mirror so that its normal is able to describe a path in a three-dimensional space, and
    an optical return system configured to redirect a first reflection of the plurality of separated beams on the movable mirror, towards the movable mirror so as to obtain for all the possible positions and orientations of the movable mirror, a plurality of offset laser beams, each offset laser beam offset spatially being able to describe a circle in a plane perpendicular to their respective main propagation axes A.

19. The system according to claim 1, wherein the spatial offsetting unit comprises:
    a mirror:
        having a substantially planar reflection surface defined by a normal to provide a first plurality of reflected laser beams resulting from the plurality of separated laser beams, and
        movable such that its normal is capable of describing a path in a three-dimensional space;
    the spatial offsetting unit being configured so that the plurality of separated laser beams and the normal of the mirror are separated by an angle between 0° and 15° for all the possible positions and orientations of a movable mirror; and
    a retro-reflective system:
        positioned with respect to the mirror to obtain from the first plurality of reflected laser beams, a second plurality of laser beams incident to the mirror for all the positions and orientations of the mirror, to obtain the plurality of offset laser beams from a reflection of the second plurality of laser beams incident to the movable mirror, and
        capable of providing the second plurality of laser beams incident to the mirror, parallel to the first plurality of reflected laser beams for all the possible positions and orientations of the movable mirror.

20. A method for providing a plurality of offset laser beams with respect to a plurality of separated laser beams for machining a part and comprising the implementation of the following steps:
    a) providing an ultra-short pulse laser source for generating a source laser beam;
    b) providing separator controlled by a control unit;
    c) providing a spatial offsetting unit and the optical element;
    d) controlling the separator to separate the source laser beam into a plurality of separated laser beams, each of the separated laser beams being capable of propagating along different propagation axes;
    e) activating the spatial offsetting unit to produce from a plurality of separated laser beams a plurality of offset laser beams, such that each offset laser beam is capable of propagating around a main propagation axis A and is capable of describing a movement around the main propagation axis A; and f) focusing each offset laser beam on a workpiece in the direction of the propagation axis of its own by optical element.

* * * * *